(12) United States Patent
Satran et al.

(10) Patent No.: US 6,293,737 B1
(45) Date of Patent: Sep. 25, 2001

(54) CUTTING INSERT AND THE ARRANGEMENT OF ITS MOUNTING IN A CUTTING TOOL

(75) Inventors: Amir Satran, Kfar Vradim; Carol Smilovici, Acco; Ilana Zeira, Kfar Vradim, all of (IL)

(73) Assignee: Iscar Ltd., Migdal Tefen (IL)

( * ) Notice: Subject to any disclaimer, the term of this patent is extended or adjusted under 35 U.S.C. 154(b) by 0 days.

(21) Appl. No.: 09/442,405

(22) Filed: Nov. 18, 1999

(30) Foreign Application Priority Data

Nov. 20, 1998 (IL) ......................................................... 127175

(51) Int. Cl.[7] .................................................... B23B 27/16
(52) U.S. Cl. ................................ 407/113; 407/46; 407/40
(58) Field of Search ............................. 407/113–116, 46, 407/48, 40, 35

(56) References Cited

U.S. PATENT DOCUMENTS

| 4,202,650 |   | 5/1980  | Erickson .              |         |
|-----------|---|---------|-------------------------|---------|
| 4,470,732 | * | 9/1984  | Lindsay                 | 407/48  |
| 5,083,887 |   | 1/1992  | Dotany .                |         |
| 5,129,767 | * | 7/1992  | Satran et al.           | 407/40  |
| 5,382,118 | * | 1/1995  | Satran et al.           | 407/113 |
| 5,454,670 | * | 10/1995 | Noda et al.             | 407/114 |
| 5,682,803 | * | 11/1997 | Boianjiu                | 407/101 |
| 5,853,267 | * | 12/1998 | Satran et al.           | 407/113 |
| 6,053,672 | * | 4/2000  | Satran et al.           | 407/40  |
| 6,058,989 | * | 5/2000  | LaGrange et al.         | 407/113 |

FOREIGN PATENT DOCUMENTS

| WO 97/10915 | * | 3/1997 | (WO) . |
| WO 98/07541 |   | 2/1998 | (WO) . |

\* cited by examiner

*Primary Examiner*—A. L. Wellington
*Assistant Examiner*—Erica D. Ergenbright
(74) *Attorney, Agent, or Firm*—Pennie & Edmonds LLP (57) ABSTRACT

A cutting insert for mounting on a milling cutter has a generally quadrangular shape with top and bottom surfaces, a pair of opposite first side surfaces intersecting the top surface at first cutting edges and a pair of opposite second side surfaces intersecting the top surface at second edges. Each second edge has a front cutting portion oriented substantially transversely to an adjacent first cutting edge and meeting therewith via a cutting corner. Each of the first and second side surfaces has upper and lower sections adjacent respective top and bottom surfaces, which sections have leading portions adjacent their associated cutting corner and trailing portions remote therefrom. The trailing portion of the lower section of each second side surface is at least slightly inwardly depressed relative to the leading portion of the lower section and is substantially inwardly depressed relative to the associated trailing portion of the upper section of the second side surface. The trailing portions of the lower and upper sections merge via a transition surface oriented transversely thereto.

9 Claims, 6 Drawing Sheets

CUTTING INSERT AND THE ARRANGEMENT OF ITS MOUNTING IN A CUTTING TOOL

FIELD OF THE INVENTION

This invention relates to an indexable cutting insert for mounting on a milling cutter for use in such operations as face and end milling, square shoulder milling, plunger milling and the like and, particularly, to the arrangement of an axial support of such a cutting insert in the milling cutter.

BACKGROUND OF THE INVENTION

Indexable cutting inserts used in milling cutters of the above-specified kind are often of a generally quadrangular shape and have two pairs of opposite peripheral and front cutting edges defining therebetween at least two indexable cutting corners. The cutting insert is mounted on a milling cutter so as to present an operative cutting corner associated with a peripheral cutting edge substantially co-directional with a longitudinal axis of the milling cutter and its adjacent front cutting edge substantially transverse thereto. When the cutting insert is mounted at a leading end of the milling cutter, for cutting operations of the kind specified above, with both peripheral and front cutting edges being operative, the insert needs to be provided with both axial and radial supports. To this end, insert receiving pockets formed at leading ends of milling cutters' bodies usually have an axially supporting side wall perpendicular to the pocket's base surface and substantially co-directional with the longitudinal axis of the milling cutter body, and a radially supporting side wall perpendicular to the pocket's base surface and extending radially with respect to the longitudinal axis. The axially and radially supporting walls of the insert receiving pocket meet at an innermost corner region thereof which is designed so as to receive therein an inoperative cutting corner of the cutting insert.

When a milling cutter of the above kind has an extended flute with a plurality of cutting inserts mounted therealong to form a continuous cutting line, such as for example in U.S. Pat. No. 5,083,887, the necessity to provide the cutting inserts, or at least the ones mounted at a leading end of the cutter, with the axially supporting wall, has a disadvantage in that this axially supporting wall hinders the development of chips formed by another cutting insert disposed adjacent this wall.

To avoid the use of an axially supporting wall in an insert receiving pocket designed for carrying cutting inserts mounted at a leading end of a milling cutter, the pocket is sometimes provided with a pin located adjacent an innermost corner of the pocket and protruding from the radially supporting side wall thereof. This pin is adapted to abut a radially innermost portion of the cutting insert's side surface associated with an inoperative front cutting edge thereof.

However, the above arrangement is not suitable for cases when cutting inserts of different geometries of cutting corners are to be mounted in the same insert receiving pocket. For example, a cutting insert having a cutting corner of relatively large radius cannot be supported by a pin designed to abut a cutting insert having a cutting corner of relatively small radius.

It is an object of the present invention to provide a new cutting insert and a new arrangement of its axial support in a milling cutter which, inter alia, have advantages in the above respect.

SUMMARY OF THE INVENTION

In accordance with the present invention there is provided a cutting insert for mounting on a milling cutter;

said cutting insert being of a generally quadrangular shape and having top and bottom surfaces, a pair of opposite first side surfaces intersecting said top surface at first cutting edges and a pair of opposite second side surfaces intersecting said top surface at second edges each having a front cutting portion oriented substantially transversely to an adjacent first cutting edge and meeting therewith via a cutting corner;

each of said first and second side surfaces having upper and lower sections adjacent respective top and bottom surfaces, which sections have leading portions adjacent their associated cutting corner and trailing portions remote therefrom, the trailing portion of the lower section of each second side surface being at least slightly inwardly depressed relative to the leading portion of said lower section and being substantially inwardly depressed relative to the associated trailing portion of the upper section of said second side surface, the trailing portions of the lower and upper sections merging via a transition surface oriented transversely thereto.

The design of the second side surfaces in the cutting insert according to the present invention enables the use of the trailing portion of its lower section for an axial support of the cutting insert when mounted in an insert receiving pocket of a tool holder, whereby the axial support is arranged at a region of an inoperative side surface which is remote from the cutting insert's inoperative cutting corner, and in a manner which does not require additional space in the axial direction of the tool holder.

Therefore, the design of the axial support arrangement does not depend on the geometry of the cutting insert's cutting corners, whereby cutting inserts having different cutting corner geometries may be supported by one and the same insert receiving pocket of a tool holder.

Preferably, the trailing portion of the upper section of each second side surface extends outwardly from its associated second cutting edge towards the lower section thereof. By virtue of this, the trailing portion of the lower section of the cutting insert's second side surface may be depressed inwardly to the extent required for the axial support without essential reduction of the area of the bottom surface of the cutting insert. It is still more preferable in this case that the upper sections of the first side surfaces of the cutting insert also slope generally outwardly from their associated cutting edges in the direction of the cutting insert's bottom surface, whereby the first cutting edges of the cutting insert are provided with a strengthened cutting edge.

If desired, the leading portion of the lower section of each second side surface is depressed relative to the leading portion of the upper section thereof.

It should be mentioned here that a cutting insert having a depressed lower section of second side surfaces combined with upper sections of side surfaces extending outwardly from the insert top surface in the direction of the insert bottom surface is disclosed in WO 98/07541. However, the lower section there does not serve for the axial support of the cutting insert and the extent of its depression increases towards the leading region of the lower section associated with an inoperative cutting corner, which is contrary to the present invention.

The cutting insert according to the present invention is designed for use in a milling cutting comprising a tool holder which has a longitudinal axis and is formed with an insert receiving pocket for mounting therein the cutting insert of the present invention so as to present a substantially axially directed operative first cutting edge. The insert receiving pocket has a base surface of a shape generally corresponding to the shape of the bottom surface of the cutting insert, a radially supporting wall co-directional with said axis for interacting with the first side surface of the cutting insert associated with the inoperative first cutting edge, and an axially supporting element protruding upwardly from said base surface at a radially outermost and axially furthermost corner thereof, for interacting with the trailing portion of the lower section of the inoperative second side surface; said axially supporting element being designed to be substantially fully received in the area of the trailing portion of the lower section of the second side surface, the axially supporting element having a contact surface adapted to interact with said trailing portion.

To the above end, maximal dimensions of said axially supporting element in its cross-section perpendicular to the longitudinal axis are smaller than corresponding dimensions of said trailing portion and an axial extension thereof is substantially equal to an axial extension of the transition surface.

Preferably, said axially supporting element has mutually perpendicular first and second outer side walls and an inner wall, the general configuration of which mates that of the trailing portion of the lower section of the cutting insert's second side surface.

Preferably, the milling cutter is provided with a shim which forms a part of the insert receiving pocket so that said base surface and said axially supporting element belong to said shim.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE DRAWINGS

Figure 4:
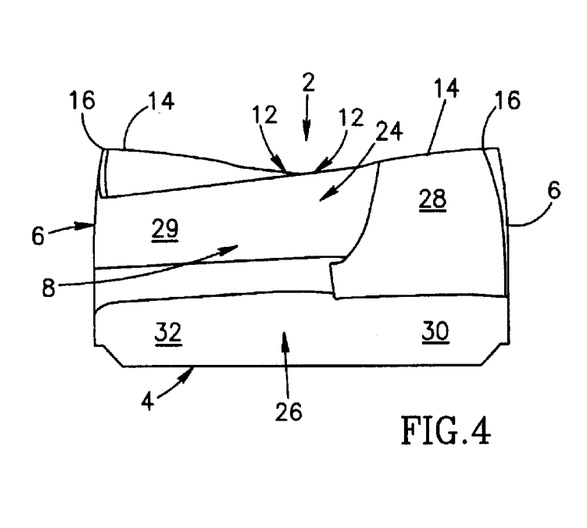
FIG. 4 is a front view of the cutting insert shown in FIG. 1.
Figure 5:
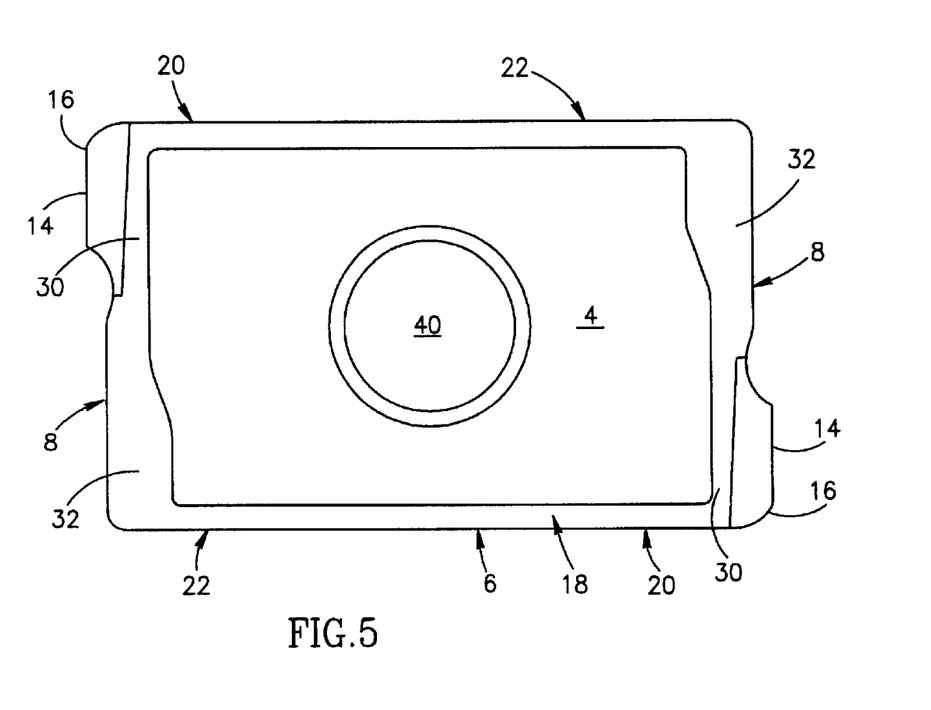
FIG. 5 is a bottom view of the cutting insert shown in FIG. 1.
Figure 6:
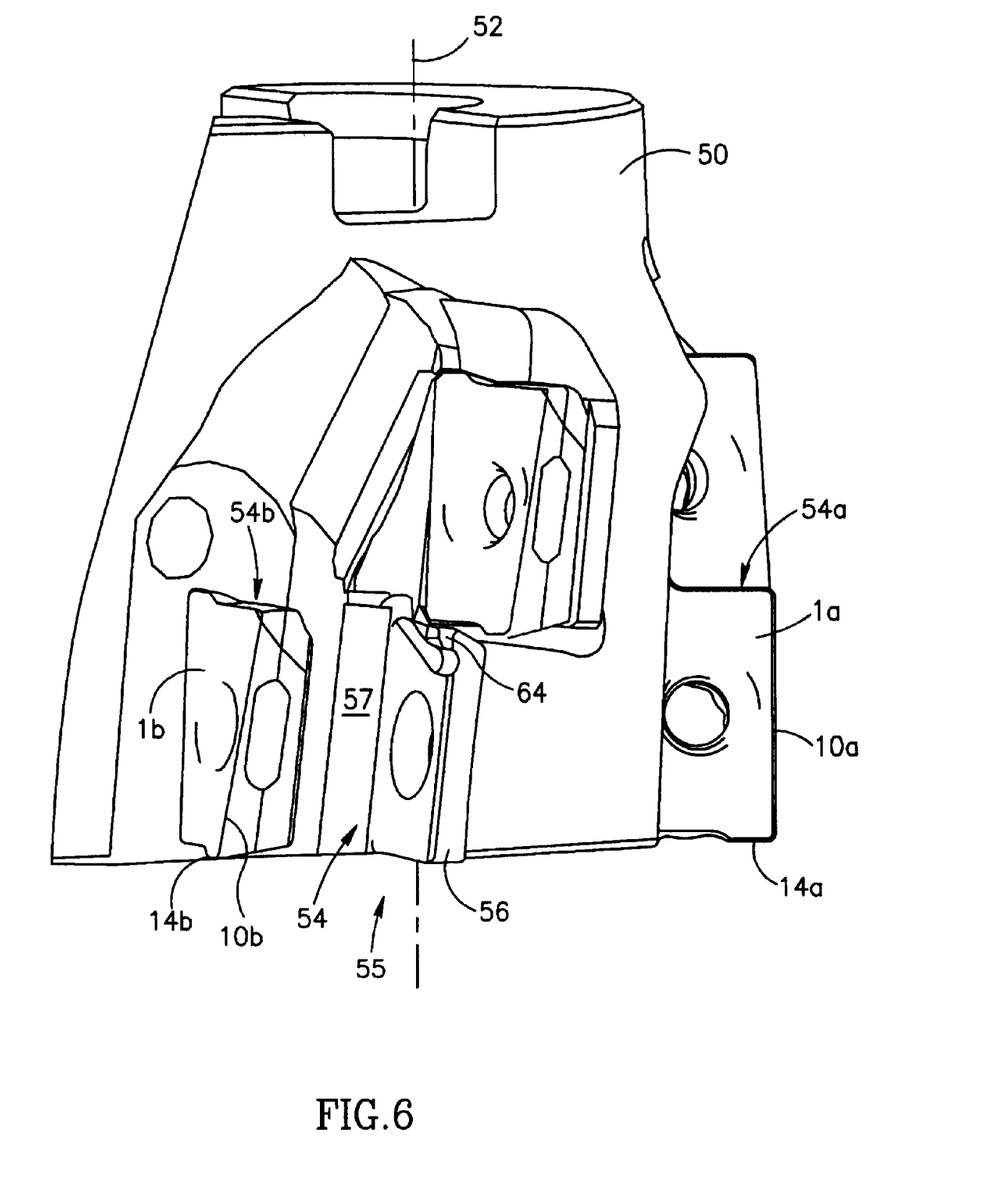
FIG. 6 is an isometric view of a milling cutter according to the present invention with cutting inserts, as shown in FIGS. 1 to 5, mounted thereon.

FIGS. 1 to 5 illustrate an indexable cutting insert 1 according to the present invention, designed for mounting on a tool holder of a milling cutter shown in FIG. 6, for use in extended shouldering or slotting operations.

The cutting insert is of a prismoidal shape and has generally quadrangular top and bottom surfaces 2 and 4, a pair of opposite first side surfaces 6 and a pair of opposite second side surfaces 8. The first side surfaces 6 intersect the top surface 2 at first cutting edges 10 and the second side surfaces 8 intersect the top surface 2 at second edges 12, each having a front cutting portion 14. The first cutting edges 10 meet with the front cutting portions 14 of the second edges 12 via cutting corners 16. During a cutting operation, each first cutting edge 10 is capable of functioning as a peripheral cutting edge and each front cutting portion 14 of the second edge 12 is capable of functioning as a wiper edge. Since the cutting geometry of these edges does not constitute the subject matter of the present invention, it will not be described further.

Figure 1:
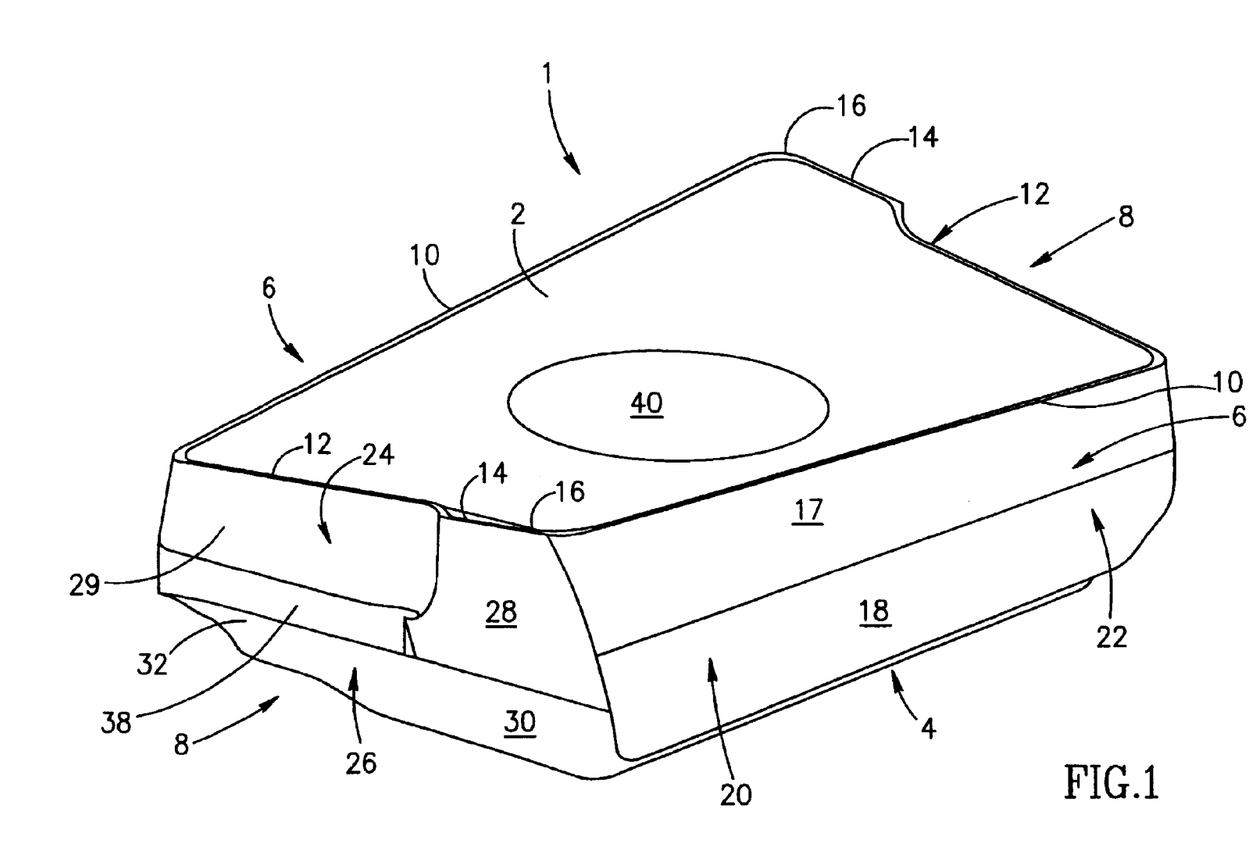
FIG. 1 is an isometric view of a cutting insert according to the present invention.
Figure 2:
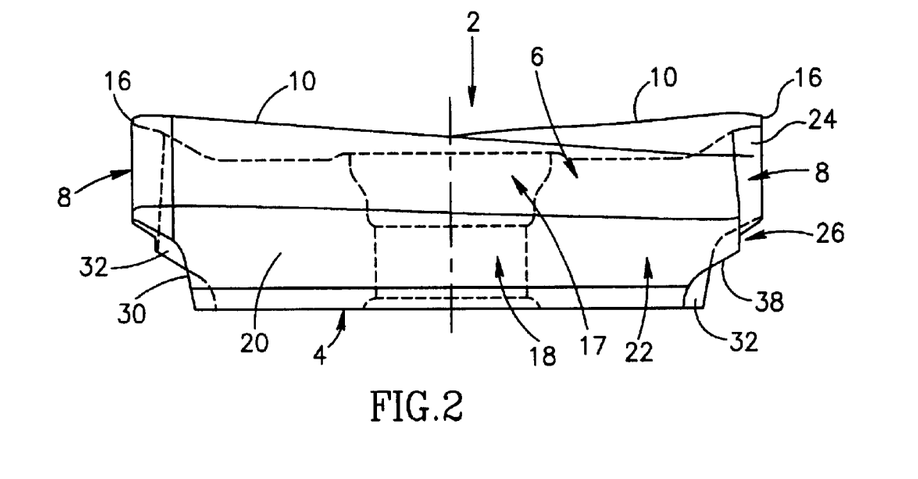
FIG. 2 is a side view of the cutting insert shown in FIG. 1.
Figure 3:
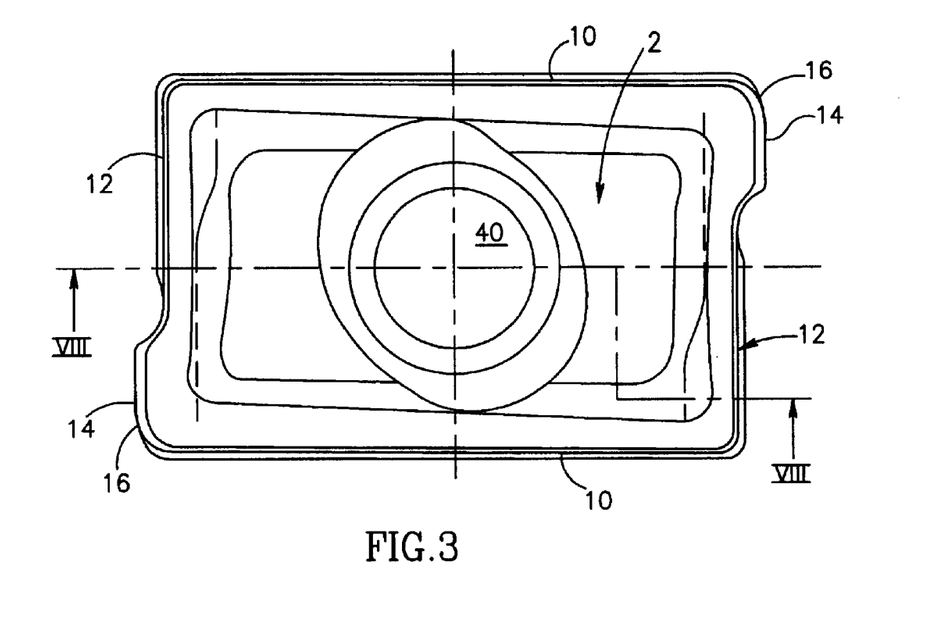
FIG. 3 is a plan view of the cutting insert shown in FIG. 1.

As shown in FIGS. 1, 2 and 5, each first side surface 6 of the cutting insert 1 has an upper section 17 (now seen in FIG. 5) and a lower section 18, the latter having a leading portion 20 adjacent the associated cutting corner 16 and a trailing portion 22 remote therefrom. As shown in FIGS. 1 and 4, each second side surface 8 of the cutting insert 1 has an upper section 24 adjacent the top surface 2 and a lower section 26 adjacent the bottom surface 4 thereof. The upper and lower sections 24 and 26 have respective leading portions 28 and 30 adjacent the associated cutting corner 16, and respective trailing portions 29 and 32 remote therefrom. The upper sections 17 and 24 of respective first and second side surfaces 6 and 8 extend generally outwardly from the top surface 2 in the direction of the bottom surface 4, and the lower sections 18 and 26 thereof are generally depressed relative to their associated upper sections 17 and 24, respectively.

As seen in FIG. 2, the trailing portion 32 of the lower section 26 of each side surface 8 merges continuously with the leading portion 30 thereof and is depressed relative to this leading portion 30. It is also substantially depressed relative to the associated trailing portion 29 of the upper section 24, a transition surface 38 therebetween being oriented substantially transversely to the trailing portions 29 and 32 of the respective upper and lower sections 24 and 26 of the second side surface 8.

The cutting insert 1 is formed with a clamping screw bore 40 for receiving therein a clamping screw 42 (shown in FIG. 8) for mounting the cutting insert 1 in a tool holder 50 shown in FIG. 6.

The tool holder 50 has a longitudinal axis 52 and a plurality of insert receiving pockets some of which, i.e. those designated as 54, 54a and 54b, are formed at a leading end 55 of the tool holder 50. As schematically shown in FIG. 6 with respect to the pockets 54a and 54b, the cutting inserts 1a and 1b are mounted there so as to present a substantially axially directed peripheral cutting edge 10a, 10b and operative wiper edge 14a and 14b. The geometry of the insert receiving pockets 54, 54a and 54b will be further described with respect to the pocket 54, which is shown in FIG. 6 without a cutting insert.

As seen in FIG. 6, the insert receiving pocket 54 is provided with a shim 56 for bearing the cutting insert 1 and a side wall 57 for the provision of the cutting insert 1 with a radial support. The shim 56 which is shown also in FIG. 7, has a body 58 with long and short side surfaces 60 and 61, respectively, a base upper surface 62 generally corresponding in shape to the bottom surface 4 of the cutting insert 1, for interacting with this bottom surface 4, a protrusion 64 formed on the base upper surface 62 for the axial support of the cutting insert 1, and a lower positioning surface 65. The body 58 of the shim 56 tapers inwardly from the base upper surface 62 towards the lower positioning surface 65.

Figure 7:
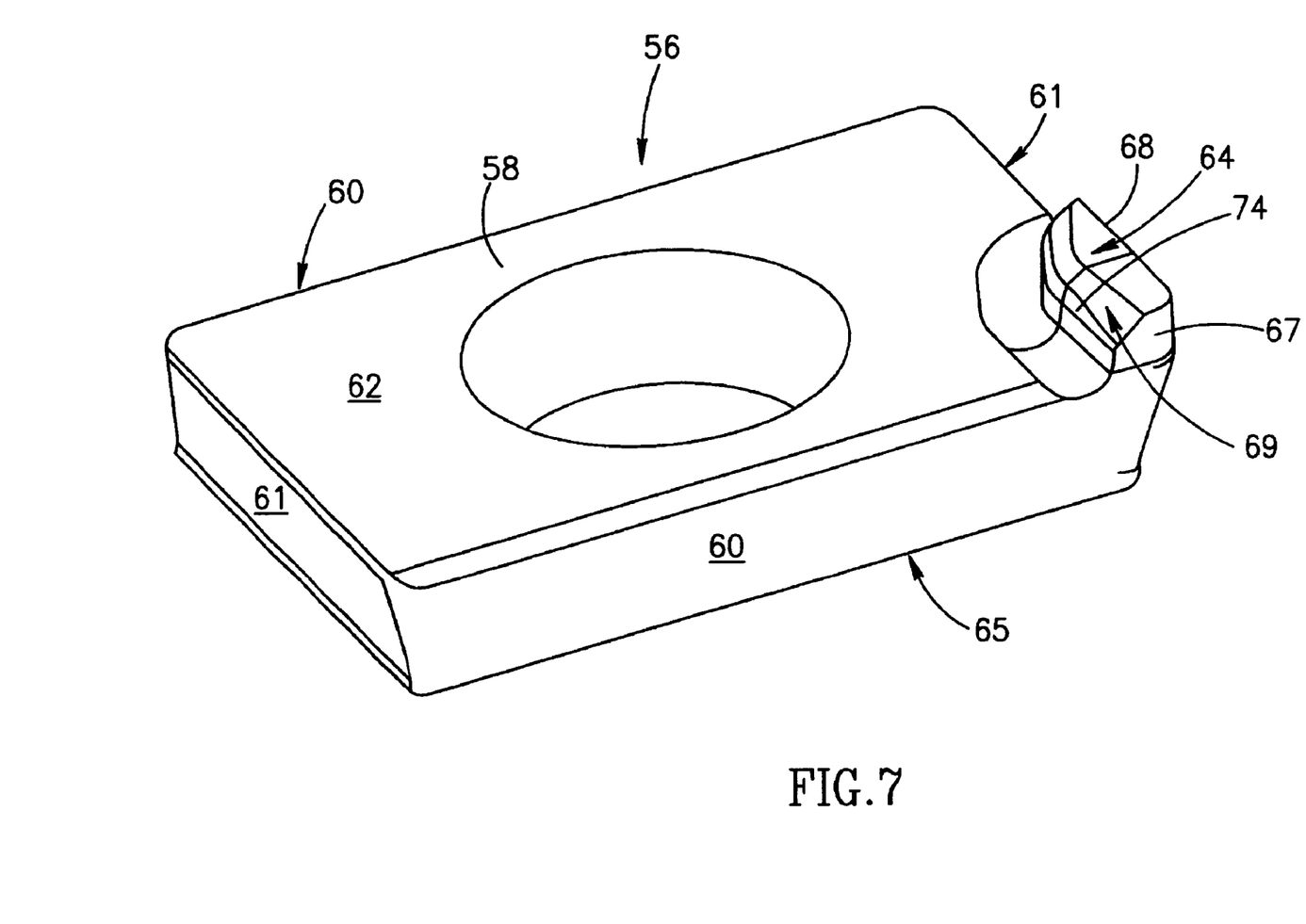
FIG. 7 is an isometric view of a shim according to the present invention, used in the milling cutter shown in FIG. 6.

The protrusion 64 has mutually perpendicular first and second outer side walls 67 and 68, respectively, which are substantially flush with the respective side surfaces 60 and 61 of the shim 56, and an inner wall 69 of a configuration which generally mates with that of the depressed region associated with the trailing portion 32 of the lower section 26 of the cutting insert's second side surface 8. Thus, the protrusion 64 has maximal dimensions in the cross-section thereof perpendicular to the axis 52 of the tool holder (FIG. 6), which are smaller than corresponding dimensions of the trailing portion 32. The maximal extension of the protrusion 64 in the direction parallel to the axis 52 is substantially equal to the axial length of the transition surface 38 between the trailing portions 32 and 29 of the second side surface's respective lower and upper sections 26 and 24.

Figure 8:
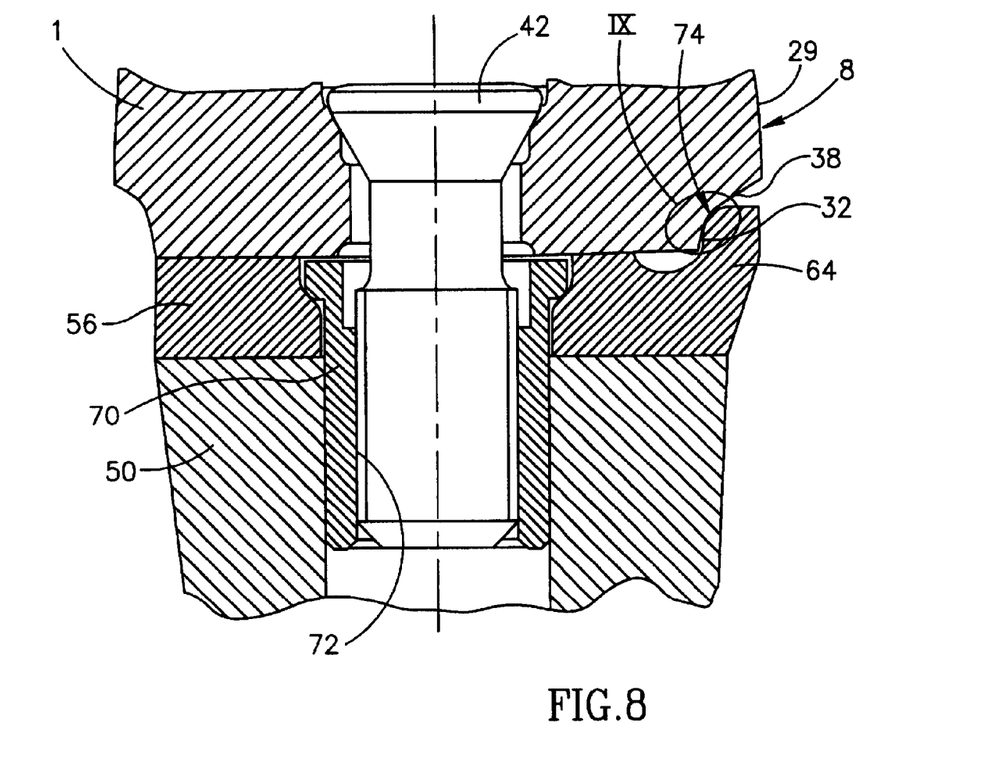
FIG. 8 is a cross-sectional view of the cutting insert as shown in FIG. 3, taken along the line VIII—VIII, when mounted on the milling cutter shown in FIG. 6.
Figure 9:
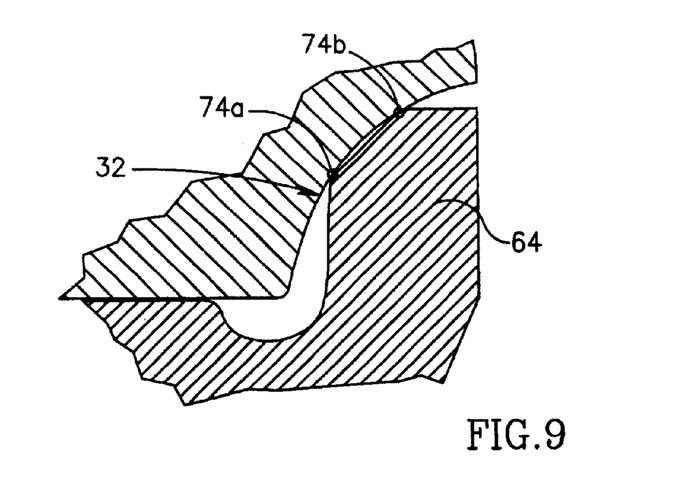
FIG. 9 is an enlarged view of a detail IX shown in FIG. 8.

FIG. 8 illustrates the cutting insert 1 mounted on the shim 56 fastened on the tool holder 50. As seen, the shim 56 is fastened by means of a bushing 70 of a relatively large diameter, provided with a threaded bore 72 in which the clamping screw 42 of the cutting insert 1 is screwed. It is also seen how the protrusion 64 of the shim 56 provides the cutting insert 1 with the axial support, being fully received in the area of the trailing portion 32 of the side surface's lower section 26 thereof and interacting with the trailing portion 32 at its contact area designated generally as 74. As shown in FIG. 9, the protrusion 64 of the shim 56 and the contact area 74 of the cutting insert 1 are so shaped that the contact therebetween takes place along two spaced lines 74a and 74b.

The cutting insert 1, particularly its second side surfaces 8 and, consequently, the arrangement of its axial support, may have alternative designs not described above and not shown in the drawings. Thus, for example, the cutting insert's cutting corners may not necessarily have a protruding wiper. The upper portions of the side surfaces of the cutting insert may have any appropriate shape, e.g. they may have a conventional positive or negative geometry. The upper and lower sections of the side surfaces and their leading and trailing portions may merge with each other both continuously and in a step-like fashion. The insert receiving pocket may not be provided with a shim but rather have an integral base surface formed with the protrusion. The protrusion may have any shape, provided it is capable of axially supporting the cutting insert when mounted in a tool holder, at the radially outermost region of its inoperative second side surface. The cutting insert and the tool holder may be used in cutting tools designed for other cutting operations, e.g. face milling.

REFERENCE NUMERALS USED IN THE DRAWINGS:

| | |
|---|---|
| 1 | cutting insert (FIGS. 1–5) |
| 1a, 1b | cutting inserts (FIG. 6) |
| 2 | top surface |
| 4 | bottom surface |
| 6 | first side surfaces |
| 8 | second side surfaces |
| 10 | first cutting edges |
| 10a, 10b | peripheral cutting edges of the cutting inserts 1a, 1b |
| 12 | second edges |
| 14 | front cutting edges |
| 14a, 14b | operative wiper edges of the cutting inserts 1a, 1b |
| 16 | cutting corners |
| 17 | upper section of the first side surface 6 |
| 18 | lower section of the first side surface 6 |
| 20 | leading portion of the lower section 18 |
| 22 | trailing portion of the lower section 18 |

-continued

REFERENCE NUMERALS USED IN THE DRAWINGS:

| | |
|---|---|
| 24 | upper section of the second side surface 8 |
| 26 | lower section of the second side surface 8 |
| 28 | leading portion of the upper section 24 |
| 29 | trailing portion of the upper section 24 |
| 30 | leading portion of the lower section 26 |
| 32 | trailing portion of the lower section 26 |
| 38 | transition surface |
| 40 | clamping screw bore |
| 42 | clamping scew |
| 50 | tool holder |
| 52 | longitudinal axis of the tool holder 50 |
| 54, 54a, 54b | insert receiving pockets |
| 55 | leading end of the tool holder 50 |
| 56 | shim |
| 57 | side wall of the insert receiving pocket 54 |
| 58 | body of the shim 56 |
| 60, 61 | side surfaces of the body 58 |
| 62 | base upper surface of the shim 56 |
| 64 | protrusion of the shim 56 |
| 65 | lower positioning surface of the shim 56 |
| 67, 68 | outer side walls of the protrusion 64 |
| 69 | inner side wall of the protrusion 64 |
| 70 | bushing |
| 72 | threaded bore of the shim 56 |
| 74 | contact area of the protrusion 64 |

What is claimed is:

1. A cutting insert for mounting on a milling cutter;
said cutting insert being of a generally quadrangular shape and having top and bottom surfaces, a pair of opposite first side surfaces intersecting said top surface at first cutting edges and a pair of opposite second side surfaces intersecting said top surface at second edges each having a front cutting portion oriented substantially transversely to an adjacent first cutting edge and meeting therewith via a cutting corner;
each of said first and second side surfaces having upper and lower sections adjacent respective top and bottom surfaces, which sections have leading portions adjacent their associated cutting corner and trailing portions remote therefrom, the trailing portion of the lower section of each second side surface being at least slightly inwardly depressed relative to the leading portion of said lower section and being substantially inwardly depressed relative to the associated trailing portion of the upper section of said second side surface, the trailing portions of the lower and upper sections merging via a transition surface oriented transversely thereto.

2. A cutting insert according to claim 1, wherein the trailing portion of the upper section of each second side surface extends outwardly from the second edge at which that second side surface intersects the top surface towards the lower section of that second side surface.

3. A cutting insert according to claim 2, wherein the upper sections of the first side surfaces of the cutting insert slope generally outwardly from the cutting edges at which said first side surfaces intersect said top surface in the direction of the cutting insert's bottom surface.

4. A cutting insert according to claim 1, wherein the leading portion of the lower section of each second side surface is depressed relative to the leading portion of the upper section thereof.

5. A milling cutter comprising:
a tool holder having a longitudinal axis and formed with at least one insert receiving pocket, and
a cutting insert supported in said at least one insert receiving pocket, the cutting insert having a generally quadrangular shape and having top and bottom surfaces, a pair of opposite first side surfaces intersecting said top surface at first cutting edges and a pair of opposite second side surfaces intersecting said top surface at second edges each having a front cutting portion oriented substantially transversely to an adjacent first cutting edge and meeting therewith via a cutting corner;

each of said first and second side surfaces having upper and lower sections adjacent respective top and bottom surfaces, which sections have leading portions adjacent their associated cutting corner and trailing portions remote therefrom, the trailing portion of the lower section of each second side surface being at least slightly inwardly depressed relative to the leading portion of said lower section and being substantially inwardly depressed relative to the associated trailing portion of the upper section of said second side surface, the trailing portions of the lower and upper sections merging via a transition surface oriented transversely thereto.

6. The milling cutter according to claim 5, further comprising:

a shim having a body of generally quadrangular shape and comprising a base upper surface, an opposite lower positioning surface, two opposing long side surfaces and two opposing short side surfaces extending between the base upper surface and the lower positioning surface, the base upper surface having a protrusion formed thereon, the protrusion having a first outer side wall connected to a second outer side wall and an inner wall connected to the first and second outer side walls, the first outer wall extending from a first of the two opposing long side surface, the second outer side wall extending from a first of the two opposing short side surfaces, the first long side surface being adjacent to the first short side surface and the inner wall extending from the base upper surface, wherein the shim is seated in said at least one insert receiving pocket;

the shim's base upper surface supports the bottom surface of the cutting insert; and the protrusion's inner wall abuts the trailing portion of the lower section of one of the second side surfaces of the cutting insert.

7. A milling cutter according to claim 6, wherein the protrusion has a maximal dimension in a cross-section perpendicular to the longitudinal axis of the tool holder, said maximal dimension being smaller than a corresponding dimension of the trailing portion of the lower sections of the second side surfaces of the cutting insert.

8. A milling cutter according to claim 6, wherein the base upper surface generally corresponds in shape to the bottom surface of the cutting insert.

9. A milling cutter according to claim 6, wherein the body of the shim tapers inwardly from the base upper surface towards the lower positioning surface.

* * * * *